US012494093B2

(12) United States Patent
Kobayashi et al.

(10) Patent No.: US 12,494,093 B2
(45) Date of Patent: Dec. 9, 2025

(54) METHOD PERFORMED BY INFORMATION PROCESSING APPARATUS

(71) Applicant: TOYOTA JIDOSHA KABUSHIKI KAISHA, Toyota (JP)

(72) Inventors: Ryosuke Kobayashi, Nagakute (JP); Koichi Watanabe, Tokyo-to (JP); Motofumi Kamiya, Nagoya (JP); Masaki Nishino, Anjo (JP); Jean-Sebastien Boire, Yokohama (JP); Takuya Nishioka, Nagoya (JP); Yohei Nakanishi, Nagoya (JP); Masaki Makihara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 18/444,761

(22) Filed: Feb. 19, 2024

(65) Prior Publication Data

US 2024/0312261 A1    Sep. 19, 2024

(30) Foreign Application Priority Data

Mar. 14, 2023  (JP) ................................ 2023-039975

(51) Int. Cl.
*G07C 5/00* (2006.01)
*B60L 53/30* (2019.01)
*B60L 53/66* (2019.01)
*H02J 7/34* (2006.01)

(52) U.S. Cl.
CPC .............. *G07C 5/008* (2013.01); *H02J 7/342* (2020.01)

(58) Field of Classification Search
CPC .......... G07C 5/008; H02J 7/342; B60L 53/66; B60L 53/30; B60L 53/68; G06Q 50/06
USPC ......................................................... 701/31.4
See application file for complete search history.

(56) References Cited

U.S. PATENT DOCUMENTS

| | | | |
|---|---|---|---|
| 7,183,666 B2* | 2/2007 | Arakawa | B60R 25/33 307/10.6 |
| 9,566,868 B2* | 2/2017 | Jammer | B60L 53/665 |
| 11,373,499 B2* | 6/2022 | Sawada | G06V 20/56 |
| 11,447,024 B1* | 9/2022 | Brannan | B60L 53/665 |
| 2010/0280700 A1* | 11/2010 | Morgal | G06Q 10/02 705/5 |

(Continued)

FOREIGN PATENT DOCUMENTS

JP    2019086841 A    6/2019

*Primary Examiner* — Tyler D Paige
(74) *Attorney, Agent, or Firm* — KENJA IP LAW PC

(57) ABSTRACT

An information processing apparatus displays a screen for selecting a purpose of use and a starting point of use of a power supply vehicle on a terminal apparatus used by a user, acquires a purpose of use and a starting point of use selected by the user, determines the operation plan of the power supply vehicle so as to move the power supply vehicle to the acquired starting point of use and perform a power supply operation to supply power to a vehicle of the user in a case in which the acquired purpose of use is "power supply", determines the operation plan of the power supply vehicle so as to move the power supply vehicle to the acquired starting point of use and transport the user in a case in which the acquired purpose of use is "taxi", and transmits the determined operation plan to the terminal apparatus.

3 Claims, 3 Drawing Sheets

(56) References Cited

U.S. PATENT DOCUMENTS

| | | | | |
|---|---|---|---|---|
| 2012/0303397 | A1* | 11/2012 | Prosser | B60L 53/18 |
| | | | | 705/7.12 |
| 2014/0278104 | A1* | 9/2014 | Proietty | G01C 21/3438 |
| | | | | 701/400 |
| 2016/0311357 | A1* | 10/2016 | Ortiz | H02J 7/0042 |
| 2019/0126756 | A1* | 5/2019 | Yourou | B60L 53/11 |
| 2019/0126757 | A1* | 5/2019 | Kagawa | B60L 53/11 |
| 2019/0126768 | A1* | 5/2019 | Niwa | G07C 5/004 |
| 2019/0147720 | A1* | 5/2019 | Sawada | G06V 40/10 |
| | | | | 348/148 |
| 2021/0334712 | A1* | 10/2021 | Sakurada | G06Q 10/06315 |
| 2021/0356282 | A1* | 11/2021 | Tokunaga | G01C 21/3423 |
| 2022/0122213 | A1* | 4/2022 | Ortiz | G06Q 50/40 |
| 2024/0239222 | A1* | 7/2024 | Yamada | G06Q 50/40 |
| 2024/0312261 | A1* | 9/2024 | Kobayashi | H02J 7/342 |

* cited by examiner

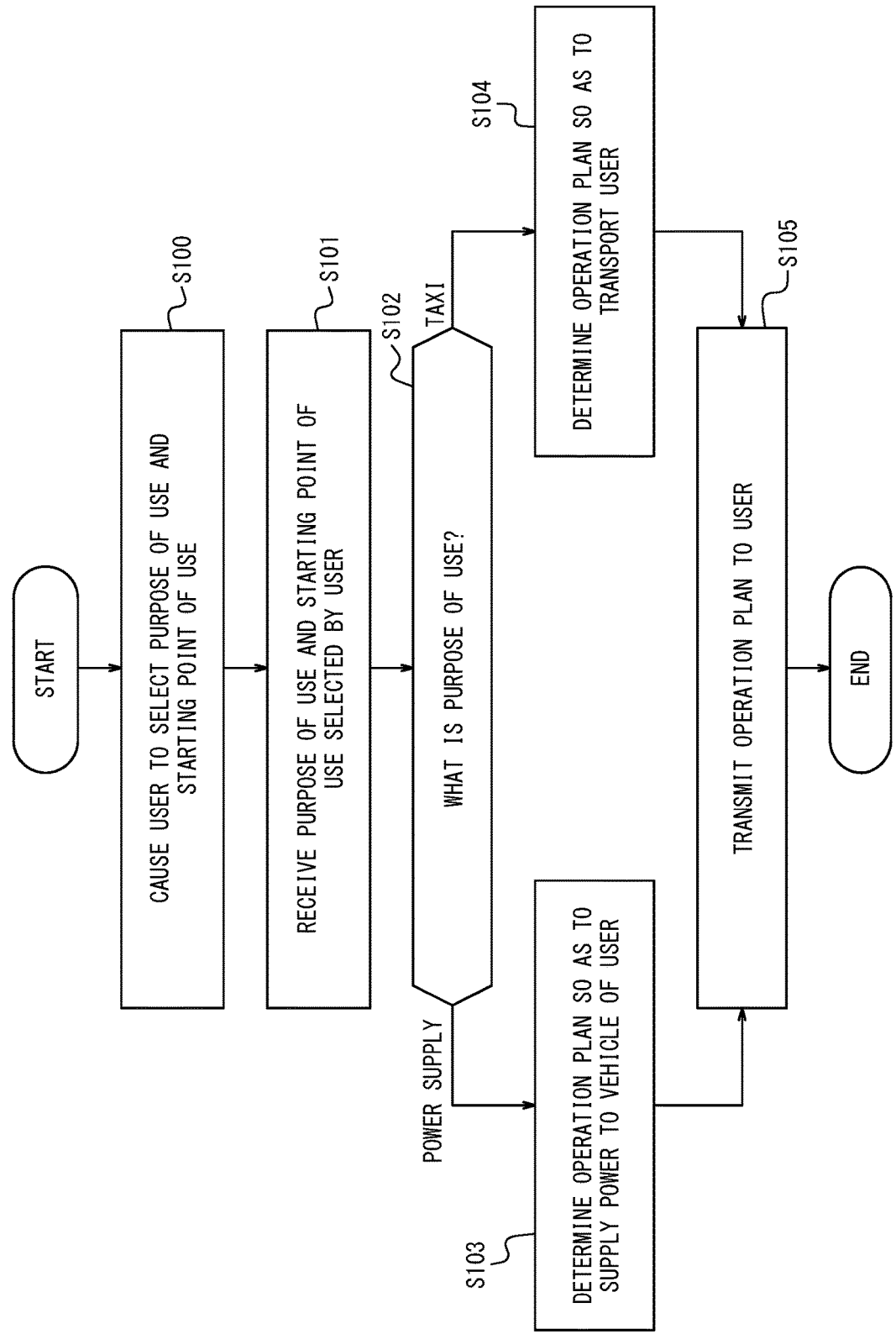

METHOD PERFORMED BY INFORMATION PROCESSING APPARATUS

CROSS-REFERENCE TO RELATED APPLICATION

This application claims priority to Japanese Patent Application No. 2023-039975 filed on Mar. 14, 2023, the entire contents of which are incorporated herein by reference.

TECHNICAL FIELD

The present disclosure relates to a method performed by an information processing apparatus.

BACKGROUND

Technology for supplying power by a rescue electric vehicle when an electric vehicle runs out of electricity is known. For example, Patent Literature (PTL) 1 discloses technology for providing a rescue system for mobile objects that can charge energy storage apparatuses without requiring them to travel to a charging station.

CITATION LIST

Patent Literature

PTL 1: JP 2019-086841 A

SUMMARY

There is room for improvement in promoting use of a power supply vehicle to be used for applying a service that dispatches the power supply vehicle to a location designated by a user and supplies power to the vehicle of the user at the location (hereinafter also referred to as "rush charging service").

It would be helpful to improve technology for promoting use of a power supply vehicle to be used for applying a rush charging service.

A method according to an embodiment of the present disclosure is a method performed by an information processing apparatus configured to determine an operation plan of a power supply vehicle in accordance with a purpose of use by a user, the method including:
  displaying a screen for selecting a purpose of use and a starting point of use of the power supply vehicle on a terminal apparatus used by the user;
  acquiring a purpose of use and a starting point of use selected by the user;
  determining the operation plan of the power supply vehicle so as to move the power supply vehicle to the acquired starting point of use and perform a power supply operation to supply power to a vehicle of the user in a case in which the acquired purpose of use is "power supply";
  determining the operation plan of the power supply vehicle so as to move the power supply vehicle to the acquired starting point of use and transport the user in a case in which the acquired purpose of use is "taxi"; and
  transmitting the determined operation plan to the terminal apparatus of the user.

According to an embodiment of the present disclosure, technology for promoting use of a power supply vehicle to be used for applying a rush charging service is improved.

BRIEF DESCRIPTION OF THE DRAWINGS

In the accompanying drawings:
FIG. 4 is a flowchart illustrating operations of the information processing apparatus.

DETAILED DESCRIPTION

Hereinafter, an embodiment of the present disclosure will be described.

Outline of Embodiment

Figure 1:
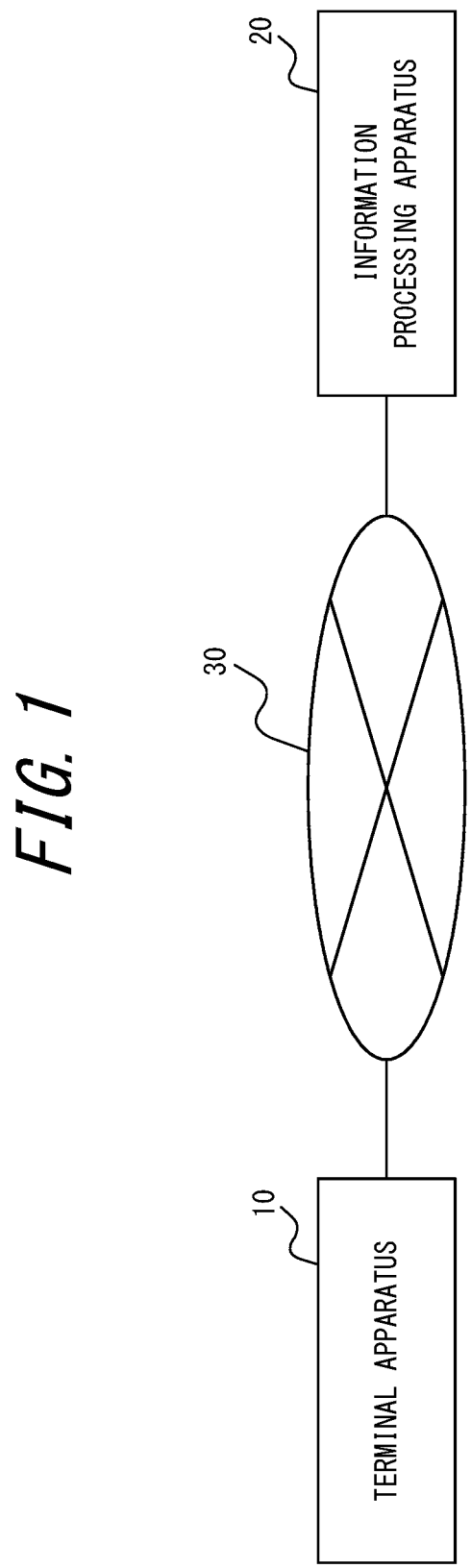
FIG. 1 is a block diagram illustrating a schematic configuration of a system according to an embodiment of the present disclosure.

An outline of a system 1 according to an embodiment of the present disclosure will be described with reference to FIG. 1. The system 1 includes a plurality of terminal apparatuses 10 and an information processing apparatus 20. The plurality of terminal apparatuses 10 and the information processing apparatus 20 are communicably connected to a network 30 including, for example, the Internet, a mobile communication network, or the like.

The terminal apparatuses 10 are computers, such as personal computers (PCs), smartphones, or tablet terminals, for example. In the present embodiment, the terminal apparatus 10 is used, for example, by a user who wishes to use a run-of-the-mill charging service. The terminal apparatus 10 may be a computer mounted on an electric vehicle.

The information processing apparatus 20 is, for example, a computer such as a server apparatus. The information processing apparatus 20 can communicate with the plurality of terminal apparatuses 10 via the network 30.

First, an outline of the present embodiment will be described, and details thereof will be described later. The information processing apparatus 20 causes the terminal apparatus 10 used by the user to display a screen for selecting the purpose of use and the starting point of use of the power supply vehicle on the terminal apparatus 10 used by the user. The information processing apparatus 20 then acquires the purpose of use and the starting point of use selected by the user. Then, the information processing apparatus 20 determines an operation plan of the power supply vehicle so as to move the power supply vehicle to the acquired starting point of use and perform a power supply operation to supply power to the vehicle of the user in a case in which the acquired purpose of use is "power supply", and determines the operation plan of the power supply vehicle so as to move the power supply vehicle to the acquired starting point of use and transport the user in a case in which the acquired purpose of use is "taxi". Finally, the determined operation plan is sent to the terminal apparatus 10 of the user.

Thus, according to the present embodiment, the power supply vehicle owned by the power supply service provider can also be used as a cab according to the purpose of use requested by the user by the information processing apparatus 20. Thus, the power supply service provider can provide cab service in addition to the power supply service without having to own a cab vehicle separate from the power supply vehicle. Thus, according to the present embodiment, the technology for promoting the use of power supply vehicle is improved in that the probability of using a power supply vehicle is increased by the fact that the vehicle can be used for tasks other than power supply.

Next, configurations of the system 1 will be described in detail.

Configuration of Terminal Apparatus

Figure 2:
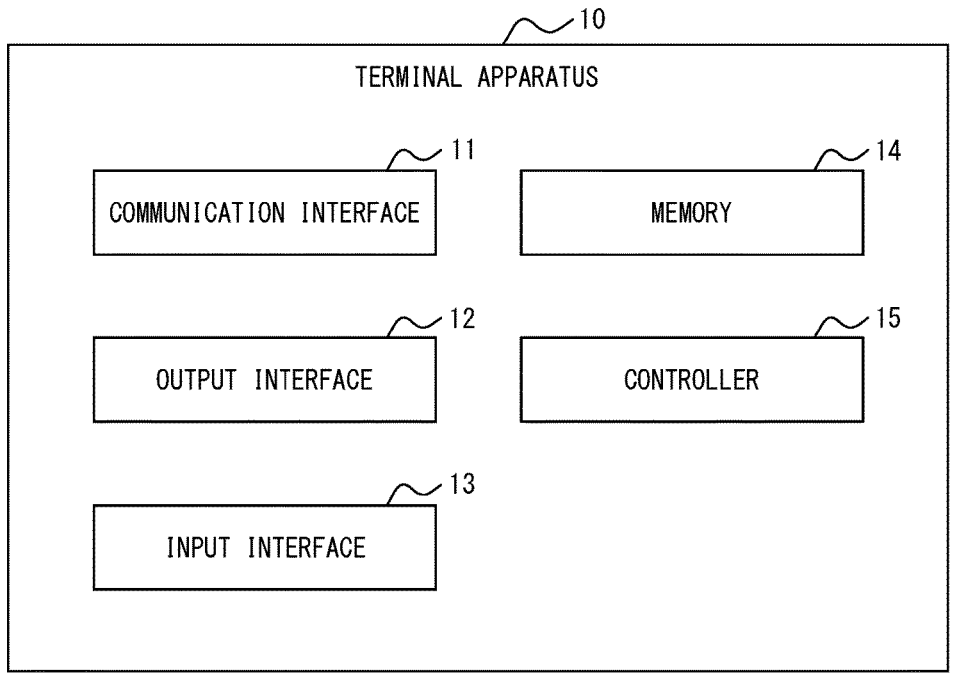
FIG. 2 is a block diagram illustrating a schematic configuration of a terminal apparatus.

As illustrated in FIG. 2, the terminal apparatus 10 includes a communication interface 11, an output interface 12, an input interface 13, a memory 14, and a controller 15.

The communication interface 11 includes at least one communication interface for connecting to the network. The communication interface is compliant with mobile communication standards such as the 4th generation (4G) standard or the 5th generation (5G) standard, for example, but these examples are not limiting. In the present embodiment, the terminal apparatus 10 communicates with the information processing apparatus 20 via the communication interface 11 and the network 30.

The output interface 12 includes at least one output device for outputting information. The output device is a display for outputting information as video, a speaker for outputting information as audio, or the like, for example, but is not limited to these. Alternatively, the output interface 12 may include an interface for connecting to an external output device.

The input interface 13 includes at least one input device for detecting an input operation by the user. The input device is a physical key, a capacitive key, a mouse, a touch panel, a touch screen integrally provided with a display of the output interface 12, a microphone, or the like, for example, but is not limited to these. Alternatively, the input interface 13 may include an interface for connecting to an external input device.

The memory 14 includes one or more memories. The memories are semiconductor memories, magnetic memories, optical memories, or the like, for example, but are not limited to these. The memories included in the memory 14 may each function as, for example, a main memory, an auxiliary memory, or a cache memory. The memory 14 stores any information to be used for operations of the terminal apparatus 10. For example, the memory 14 may store a system program, an application program, embedded software, and the like. The information stored in the memory 14 may be updated with, for example, information acquired from the network 30 via the communication interface 11.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire terminal apparatus 10.

Configuration of Information Processing Apparatus

Figure 3:
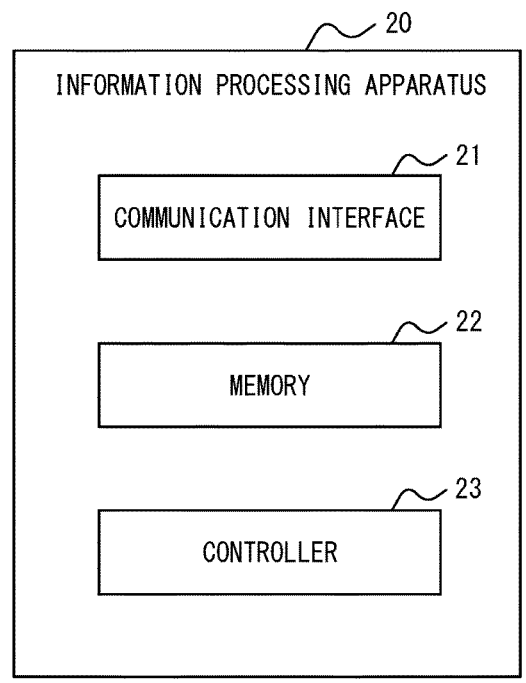
FIG. 3 is a block diagram illustrating a schematic configuration of an information processing apparatus.

As illustrated in FIG. 3, the information processing apparatus 20 includes a communication interface 21, a memory 22, and a controller 23.

The communication interface 21 includes at least one communication interface for connecting to the network 30. The communication interface is compliant with, for example, mobile communication standards, wired local area network (LAN) standards, or wireless LAN standards, but is not limited to these, and may be compliant with any appropriate communication standards. In the present embodiment, the information processing apparatus 20 communicates with the plurality of terminal apparatuses 10 via the communication interface 21 and the network 30.

The memory 22 includes one or more memories. The memories included in the memory 22 may each function as, for example, a main memory, an auxiliary memory, or a cache memory. The memory 22 stores any information used for operations of the information processing apparatus 20. For example, the memory 22 may store a system program, an application program, embedded software, a database, and the like. The information stored in the memory 22 may be updated with, for example, information acquired from the network 30 via the communication interface 21.

The controller 23 includes at least one processor, at least one programmable circuit, at least one dedicated circuit, or a combination of these. The controller 23 controls the operations of the entire information processing apparatus 20.

Flow of Operations of Information Processing Apparatus

Operations of the information processing apparatus 20 according to the present embodiment will be described with reference to FIG. 4.

Step S100: The controller 23 of the information processing apparatus 20 causes the terminal apparatus 10 used by the user to display a screen for selecting the purpose of use and the starting point of use of the power supply vehicle on the terminal apparatus 10 used by the user.

Specifically, a user who wishes to use the service enters information on the terminal apparatus 10 regarding his/her desire to use the service. The terminal apparatus 10 transmits the information regarding a desire for use to the information processing apparatus 20. When the controller 23 of the information processing apparatus 20 receives information regarding a desire for use from the terminal apparatus 10 via the communication interface 21, it sends a command to the terminal apparatus 10 to display a screen for selecting the purpose of use and the starting point of use of the power supply vehicle. The terminal apparatus 10 displays, upon receipt of the command from the controller 23 via the communication interface 11, a screen for selecting the purpose of use and the starting point of use of the power supply vehicle on the screen of the terminal apparatus 10. However, the terminal apparatus 10 can employ any method, including but not limited to the example above, such as displaying a screen for selecting the purpose of use and the starting point of use of the power supply vehicle using a program stored in the memory 14 of the terminal apparatus 10, without sending information regarding a desire for use to the information processing apparatus 20.

The "information regarding a desire for use" may include any information regarding a desire to use the service, including, for example, information sent when the user presses a button on the service screen displayed on the terminal apparatus 10 that indicates that the user wishes to use the service.

In the present embodiment, options of the purpose of use include "power supply" to perform power supply operations to the vehicle of the user and "taxi" to transport the user. The purpose of use and the starting point of use can be selected by any method other than the selection method, such as direct input or voice input, rather than by the selection method that displays a screen for selection.

The controller 23 may also receive the positional information for the terminal apparatus 10 when receiving information from the terminal apparatus 10 regarding the desire to use the power supply vehicle, and control the candidate locations for the starting point of use based on the positional information. For example, the order in which the candidate locations for the starting point of use are displayed may be changed.

Step S101: The controller 23 acquires the purpose of use and the starting point of use selected by the user.

Specifically, the controller 15 of the terminal apparatus 10 sends the purpose of use and the starting point of use selected by the user to the information processing apparatus 20. The controller 23 of the information processing apparatus 20 acquires the purpose of use and the starting point of use by receiving the purpose of use and the starting point of use from the terminal apparatus 10 via the communication interface 21.

Step S102: The controller 23 determines the next process to be performed according to the acquired purpose of use.

Specifically, the controller 23 determines whether the purpose of use is either "power supply" or "taxi". If the purpose of use is "power supply" (step S102—Power Supply), the process proceeds to step S103. If the purpose of use is "taxi" (step S102—Taxi), the process proceeds to step S104.

Step S103: The controller 23 determines an operation plan of the power supply vehicle so as to move the power supply vehicle to the starting point of use and perform the power supply operation to supply power to the vehicle of the user.

Step S104: The controller 23 determines an operation plan of the power supply vehicle so as to move the power supply vehicle to the starting point of use and transport the user (i.e., performs taxi operations).

The "operation plan" may include, for example, information identifying the power supply vehicle, the starting point of use of the power supply vehicle, the estimated time of arrival at the starting point of use of the power supply vehicle, and the purpose of use such as "power supply" or "taxi", but may also include any other information necessary for the operation of the power supply vehicle. For example, it may further include the estimated time of use of the power supply vehicle.

The power supply vehicle may be operated directly or remotely by the driver. The power supply vehicle may be capable of automated driving such as any one of Level 1 to Level 5 as defined by the Society of Automotive Engineers (SAE), for example.

Step S105: The controller 23 transmits the determined operation plan to the terminal apparatus 10 of the user.

If a change occurs in the determined operation plan, the controller 23 may transmit the changed operation plan to the terminal apparatus 10 of the user again.

If there are any changes the user wishes to make to the determined operation plan, the user may use the terminal apparatus 10 to transmit the changes he/she wishes to make. The controller 23 may return to step 101 and perform the process again based on what you want to change. The details to be changed can include not only the purpose of use and the starting point of use, but also all information related to the operation plan, such as the scheduled arrival time of the power supply vehicle at the starting point of use.

As described above, the information processing apparatus 20 of the present embodiment causes the terminal apparatus 10 used by the user to display a screen for selecting the purpose of use and the starting point of use of the power supply vehicle. The information processing apparatus 20 then acquires the purpose of use and the starting point of use selected by the user. Then, the information processing apparatus 20 determines an operation plan of the power supply vehicle so as to move the power supply vehicle to the acquired starting point of use and perform a power supply operation to supply power to the vehicle of the user in a case in which the acquired purpose of use is "power supply", and determines the operation plan of the power supply vehicle so as to move the power supply vehicle to the acquired starting point of use and transport the user in a case in which the acquired purpose of use is "taxi". Finally, the determined operation plan is sent to the terminal apparatus 10 of the user.

According to such a configuration, the information processing apparatus 20 allows a power supply vehicle owned by a power supply service provider to be used as a cab as well, depending on the purpose of use requested by the user. Thus, the power supply service provider can provide cab service in addition to the power supply service without having to own a cab vehicle separate from the power supply vehicle. Thus, according to the present embodiment, the technology for promoting the use of power supply vehicle is improved in that the probability of using a power supply vehicle is increased by the fact that the vehicle can be used for tasks other than power supply.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 20 in the above embodiment are distributed to multiple computers capable of communicating with each other can be implemented. For example, an embodiment in which some or all of the components of the information processing apparatus 20 are provided in the terminal apparatus 10 can also be implemented. For example, a terminal apparatus 10 mounted in the vehicle may be equipped with some or all of the components of the information processing apparatus 20.

For example, in the embodiment described above, we have described an example in which the options for the purpose of use include "power supply" and "taxi", but the options are not limited to these and may further include "car rental". In such a case, if "car rental" is selected, the controller 23 of the information processing apparatus 20 may determine an operation plan of the power supply vehicle so as to move the power supply vehicle to the starting point of use and rent out the power supply vehicle to the user temporarily.

For example, in the embodiment described above, the controller 23 of the information processing apparatus 20 may provide an incentive to the user if the purpose of use is "car rental" and the user uses a power supply vehicle to perform the power supply operation as a substitute while the vehicle is rented.

Specifically, if the user has selected "car rental" as the purpose of use in step 100, the controller 23 displays a screen to confirm whether or not the user wishes to perform the power supply operation as a substitute. Next, in step S101, the controller 23 further acquires information on whether or not the user wishes to perform the power supply operation selected by the user as a substitute. Next, in step S102, if the purpose of use is "car rental" and the user wishes to perform the power supply operation as a substitute, the controller 23 determines an operation plan of the power supply vehicle so as to move the power supply vehicle to the starting point of use, rent out the power supply vehicle to the user temporarily, and perform the power supply operation as a substitute while the vehicle is rented to the user. The controller 23 then performs step S105. If the user then performs the power supply operation, as a substitute, using the power supply vehicle while the power supply vehicle is rented, the user sends information related to the fact that the user has performed the power supply operation as a substitute to the information processing apparatus 20 using the terminal apparatus 10. The controller 23 of the information processing apparatus 20 checks the information received and the operation plan of the power supply vehicle registered in the memory 22 of the information processing apparatus 20, and decides to grant the incentive.

Incentives may include, for example, reduced rental car costs or extended rental car usage time. The incentive may include, for example, a predetermined coupon or point that can be used the next time the user in question receives the service.

The controller 23 of the information processing apparatus 20 may determine a rate of granting the incentive according to the number of times the user has performed the power supply operation as a substitute. For example, it may be determined that the higher the number of substitutions, the higher the award rate, but this is not limited to this.

For example, in the embodiment described above, if the purpose of use is "car rental" and the user wishes to perform the power supply operation as a substitute while the power supply vehicle is rented to the user, the controller 23 of the information processing apparatus 20 may confirm whether a different user who wishes power supply is present within a predetermined area centered on the power supply vehicle, which is rented to the user. If the different user is present, the information on the different user may be sent to the terminal apparatus of the user.

Specifically, if the user selected "car rental" as the purpose of use in step 100, the controller 23 further displays a screen on the terminal apparatus 10 confirming whether or not the user wishes to perform the power supply operation as a substitute. Next, in step S101, the controller 23 further acquires information on whether or not the user wishes to perform the power supply operation selected by the user as a substitute. Next, in step S102, if the purpose of use is "car rental" and the user wishes to perform the power supply operation as a substitute, the controller 23 further confirms whether a different user who wishes power supply is present within a predetermined area of the starting point of use in addition to determining the operation plan of the power supply vehicle so as to move the power supply vehicle to the starting point of use, rent out the power supply vehicle to the user temporarily, and perform the power supply operation as a substitute while the power supply vehicle is rented to the user. The method of confirming whether or not the different user is present may, for example, the starting point of use of the information on the user who wishes power supply stored in the memory 22 of the information processing apparatus 20, or the starting point of use of the power supply vehicle in the operation plan of other power supply vehicle. If the different user is present, the controller 23 further transmits information on the different user to the terminal apparatus 10 of the user in step S105.

For example, in the embodiment described above, if the purpose of use is "car rental", and the user wishes to perform the power supply operation as a substitute while the power supply vehicle is rented to the user, the controller 23 of the information processing apparatus 20 may cause the user to further select a destination point and confirm whether a different user who wishes power supply is present en route from the starting point of use to the destination point. If the different user is present, the information on the different user may be sent to the terminal apparatus 10 of the user.

Specifically, if the user selected "car rental" as the purpose of use in step 100, the controller 23 further displays a screen on the terminal apparatus 10 confirming whether or not the user wishes to perform the power supply operation as a substitute. If the user selects wishing to perform the power supply operation as a substitute, the terminal apparatus 10 further displays a screen for selecting the destination point. Next, in step S101, the controller 23 further acquires information on whether or not the user wishes to perform the power supply operation selected by the user as a substitute, as well as the destination point. Next, in step S102, if the purpose of use is "car rental" and the user wishes to perform the power supply operation as a substitute, the controller 23 further confirms whether a different user who wishes power supply is present en route from the starting point of use to the destination point in addition to determining the operation plan of the vehicle so as to move the power supply vehicle to the starting point of use, rent out the vehicle to the user temporarily, and perform the power supply operation as a substitute while the power supply vehicle is rented to the user. The method of confirming whether or not the different user is present may, for example, the starting point of use of the information on the user who wishes power supply stored in the memory 22 of the information processing apparatus 20, or the starting point of use of the power supply vehicle in the operation plan of other power supply vehicle. If the different user is present, the controller 23 further transmits information on the different user to the terminal apparatus 10 of the user in step S105.

For example, an embodiment in which a general purpose computer functions as the information processing apparatus 20 according to the above embodiment can also be implemented. Specifically, a program in which processes for realizing the functions of the information processing apparatus 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. A method performed by an information processing apparatus configured to determine an operation plan of a power supply vehicle, wherein the power supply vehicle is configured to drive automatically, in accordance with a purpose of use by a user, the method comprising:
sending a command to a terminal apparatus used by the user to display a screen for selecting a purpose of use and a starting point of use of the power supply vehicle on the terminal apparatus used by the user;
acquiring, from the terminal apparatus used by the user, a purpose of use and a starting point of use selected by the user;

determining the operation plan of the power supply vehicle so as to move the power supply vehicle to the acquired starting point of use and perform a power supply operation to supply power to a vehicle of the user in a case in which the acquired purpose of use is "power supply";

determining the operation plan of the power supply vehicle so as to move the power supply vehicle to the acquired starting point of use in a case in which the acquired purpose of use is a purpose to transport the user, other than "power supply";

transmitting the determined operation plan to the terminal apparatus of the user and a terminal apparatus of the power supply vehicle; and granting extended usage time to the user in a case in which the acquired purpose of use is the purpose to transport the user and the user performs the power supply operation, as a substitute, using the power supply vehicle while the power supply vehicle is used by the user for the purpose to transport the user.

2. The method according to claim 1, further comprising:

confirming whether a different user who wishes power supply is present within a predetermined area centered on the power supply vehicle, which is rented to the user, in a case in which the acquired purpose of use is the purpose to transport the user and the user wishes to perform the power supply operation as a substitute while the power supply vehicle is used by the user for the purpose to transport the user; and transmitting information on the different user to the terminal apparatus of the user in a case in which the different user is present.

3. The method according to claim 1, further comprising:

causing the user to further select a destination point in a case in which the acquired purpose of use is the purpose to transport the user and the user wishes to perform the power supply operation as a substitute while the power supply vehicle is used by the user for the purpose to transport the user;

confirming whether a different user who wishes power supply is present en route from the acquired starting point of use to the destination point; and transmitting information on the different user to the terminal apparatus of the user in a case in which the different user is present.

\* \* \* \* \*